United States Patent
Tanaka (10) Patent No.: US 7,326,843 B2
(45) Date of Patent: Feb. 5, 2008

(54) LOCKING NUT ASSEMBLY FOR HI-HAT CLUTCH

(75) Inventor: Yukio Tanaka, Chiba (JP)

(73) Assignee: Pearl Musical Instrument Co., Chiba (JP)

( * ) Notice: Subject to any disclaimer, the term of this patent is extended or adjusted under 35 U.S.C. 154(b) by 77 days.

(21) Appl. No.: 10/974,820

(22) Filed: Oct. 28, 2004

(65) Prior Publication Data

US 2006/0093458 A1 May 4, 2006

(51) Int. Cl.
*G10D 13/02* (2006.01)
*F16B 39/02* (2006.01)

(52) U.S. Cl. .................. 84/422.3; 84/422.1; 84/422.2; 411/259

(58) Field of Classification Search ........ 411/223–226, 411/230, 274, 260, 294, 295, 254, 255; 84/422.1, 84/422.3
See application file for complete search history.

(56) References Cited

U.S. PATENT DOCUMENTS

| | | | | | |
|---|---|---|---|---|---|
| 900,796 | A | * | 10/1908 | Tambling | .................... 411/230 |
| 1,737,317 | A | * | 11/1929 | Martin | ........................ 411/294 |
| 4,227,560 | A | * | 10/1980 | Karlsson | ...................... 411/295 |
| 4,645,395 | A | * | 2/1987 | Lundgren | .................... 411/210 |
| 5,014,844 | A | * | 5/1991 | Anttonen | .................... 198/499 |
| 5,388,495 | A | | 2/1995 | Atsumi | |
| 5,454,674 | A | * | 10/1995 | Eriksson | ..................... 411/295 |
| 5,482,235 | A | * | 1/1996 | Atsumi | ....................... 248/121 |
| 5,808,217 | A | | 9/1998 | Liao | |
| 5,895,168 | A | * | 4/1999 | Liao | .......................... 403/362 |
| 5,936,174 | A | | 8/1999 | Liao | |
| 6,011,209 | A | | 1/2000 | Liao | |

FOREIGN PATENT DOCUMENTS

JP 06348256 * 12/1994

* cited by examiner

*Primary Examiner*—Katherine Mitchell
(74) *Attorney, Agent, or Firm*—Berenato, White & Stavish (57) ABSTRACT

A locking nut assembly for hi-hat clutch comprises a main body having a bolt hole, a locking nut is disposed in the main body, the locking nut a central threaded opening for receiving a threaded stem of the hi-hat clutch, and a key bolt. The locking nut further having a threaded aperture. The key bolt passes through the bolt hole of said main body, and is threaded into the threaded aperture of the locking nut, whereby the key bolt is selectively tightened to force the threaded portion of the locking nut into engagement with the threaded stem.

13 Claims, 9 Drawing Sheets

LOCKING NUT ASSEMBLY FOR HI-HAT CLUTCH

BACKGROUND OF THE INVENTION

1. Field of the Invention

The present invention relates to a top cymbal fastening device for fixing a top cymbal to a hi-hat stand, and more particularly to a locking nut assembly of a hi-hat clutch which uses a key bolt threaded into an inner locking nut to selectively force the locking nut into engagement with a threaded stem of the hi-hat cymbal stand, permitting the top cymbal to be positively moved with the center pull rod to strike a fixed lower cymbal in producing a clashing sound.

2. Description of the Prior Art

Figure 1:
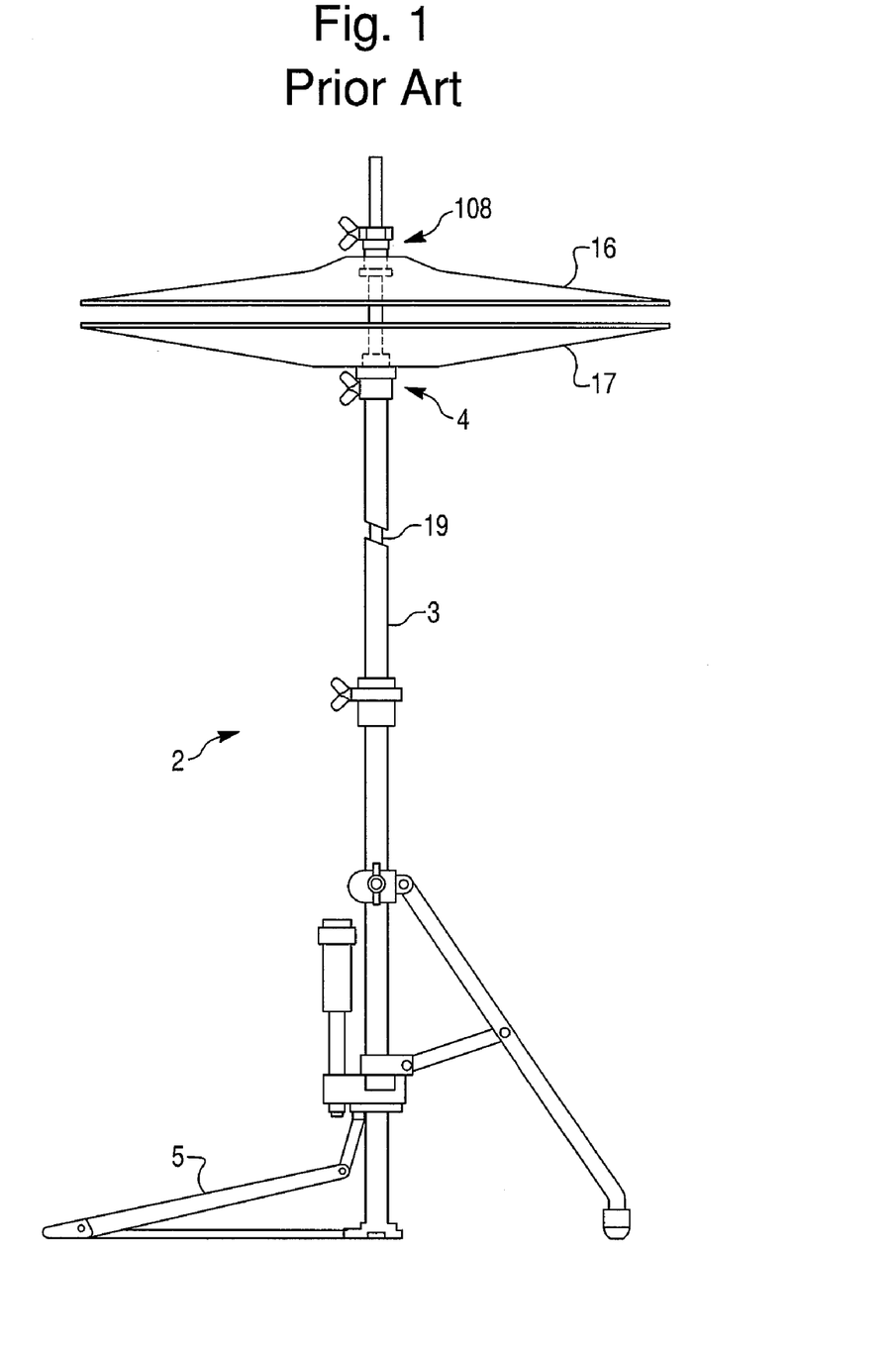
FIG. 1 is an elevational view of a conventional hi-hat stand according to the prior art.

The integral structure of a hi-hat cymbal stand 2 having a pair of conventional hi-hat cymbals, as shown in FIG. 1, usually contains a stand with a long tube 3 enclosed therein, and a lower cymbal 17 rests on top of the long tube 3 on a platform 4, wherein the long tube 3 encloses a pull rod 19; a top cymbal 16 is fixed on top of the pull rod 19 through a hi-hat clutch 108; and bottom end of the pull rod 19 is connected with a pedal 5. When the pedal 5 is pressed, the pull rod 19 will be pulled downwards to drive the top cymbal 16 to strike the lower cymbal 17 to sound; and when the pedal 5 is released, the pull rod 19 will return upwards to its original position by a restoring elastic device (not shown) to detach the top cymbal 16 from the lower one 17.

Figure 2:
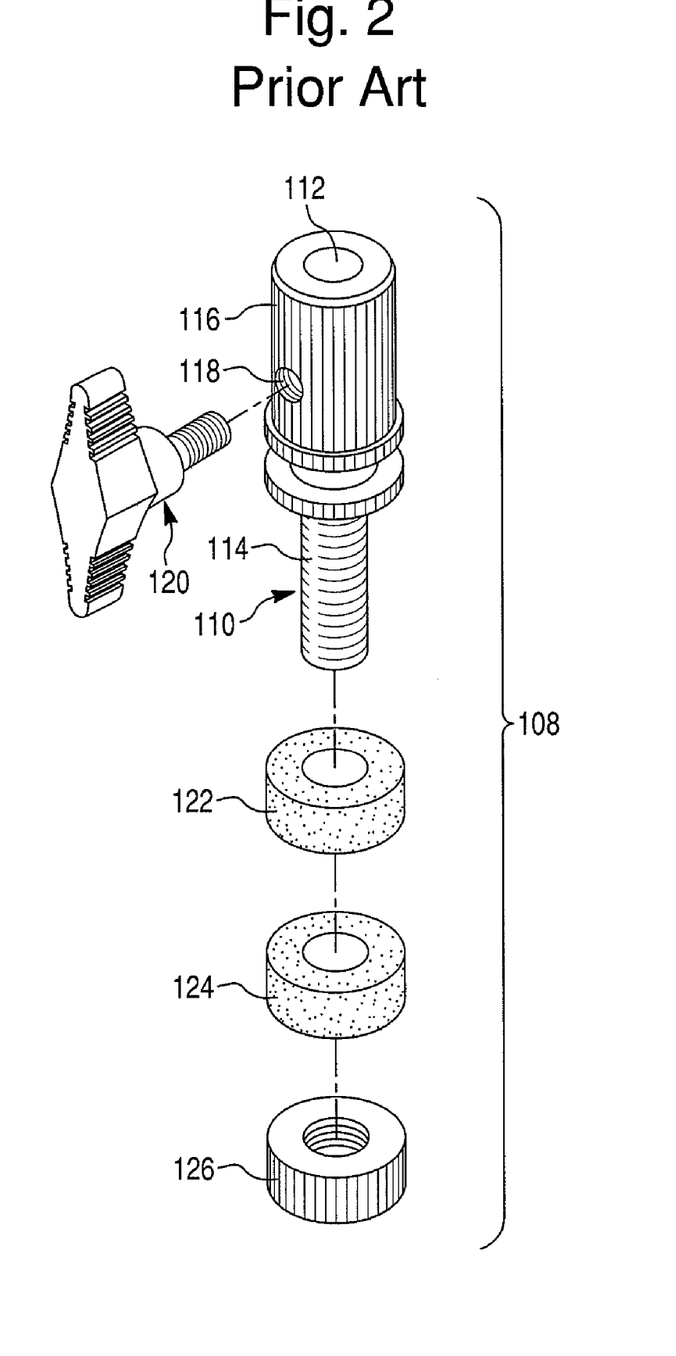
FIG. 2 is an exploded view of a hi-hat clutch for mounting a top cymbal, according to the prior art.

The hi-hat clutch 108 is provided for mounting the top cymbal 16 as shown in detail in FIG. 2 mainly contains a sleeve 110 having an externally threaded shank 114 at lower end and a cap 116 on top end with a relatively larger diameter than that of the threaded shank 114, wherein the cap 116 and the threaded shank 114 both are provided with a pivot hole 112 in center position respectively for the pull rod 19 to penetrate; and a tapped hole 118 is formed in radial direction of the cap 116 to communicate with the pivot hole 112 for a clamping bolt 120 to get engaged and to push against the pull rod 19 for locking the same.

The threaded shank 114 is further collared with two pieces of packing rings 122 and 124 for pinching the top cymbal 16 in-between, wherein a top face of the upper packing ring 122 is stopped by bottom end of the cap 116, and a bottom face of the lower packing ring 124 is stopped by a locking nut 126 for locking the top cymbal 16.

While known hi-hat clutches, including but not limited to the discussed above, have proven to be acceptable for the hi-hat stands, such devices are nevertheless susceptible to improvements that may enhance their performance. With this in mind, a need exists to develop a hi-hat clutch for the hi-hat stand with improved locking nut assembly that advances the art.

SUMMARY OF THE INVENTION

A locking nut assembly of the present invention comprises a main body having a bolt hole, a locking nut disposed adjacent the main body and having a threaded aperture, and a key bolt passing through the bolt hole of the main body and threaded into the threaded aperture of the locking nut. The locking nut further has a threaded portion facing the threaded stem and defined by a central threaded opening for receiving a threaded stem of the hi-hat clutch so that the key bolt is selectively tightened to force the threaded portion of the locking nut into engagement with the threaded stem. By way of example, the main body has an axial aperture for threading onto the threaded stem of the hi-hat clutch and the locking nut is disposed within the main body.

Thus, the present invention provides the locking nut assembly for the hi-hat clutch of the hi-hat stand that overcomes the drawbacks in the prior art by keeping the locking nut securely attached to the hi-hat clutch.

This and other advantages of the present invention will be apparent to those of skill in the art when viewed in light of the following description and associated drawings.

DETAILED DESCRIPTION OF THE PREFERRED EMBODIMENT

Figure 3:
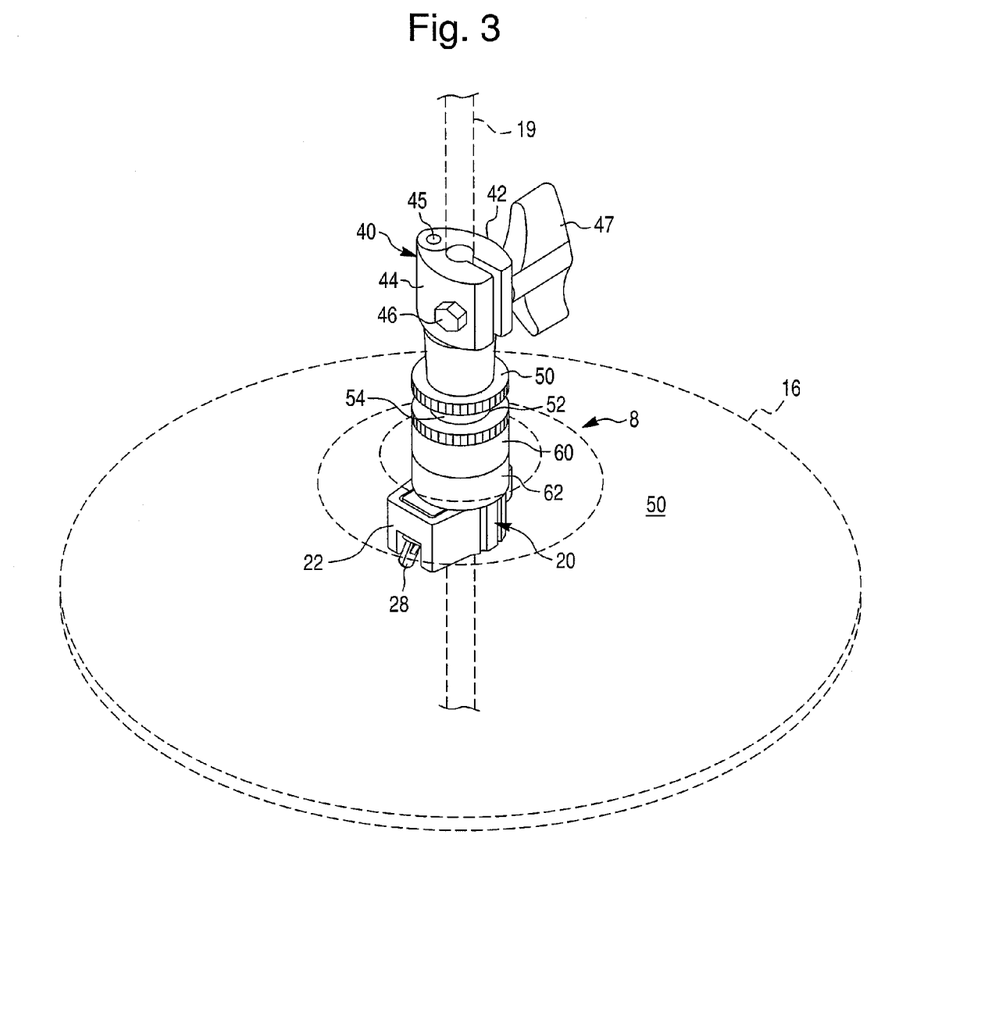
FIG. 3 is a perspective view of a hi-hat clutch for mounting a top cymbal according to the preferred embodiment of the present invention.
Figure 4:
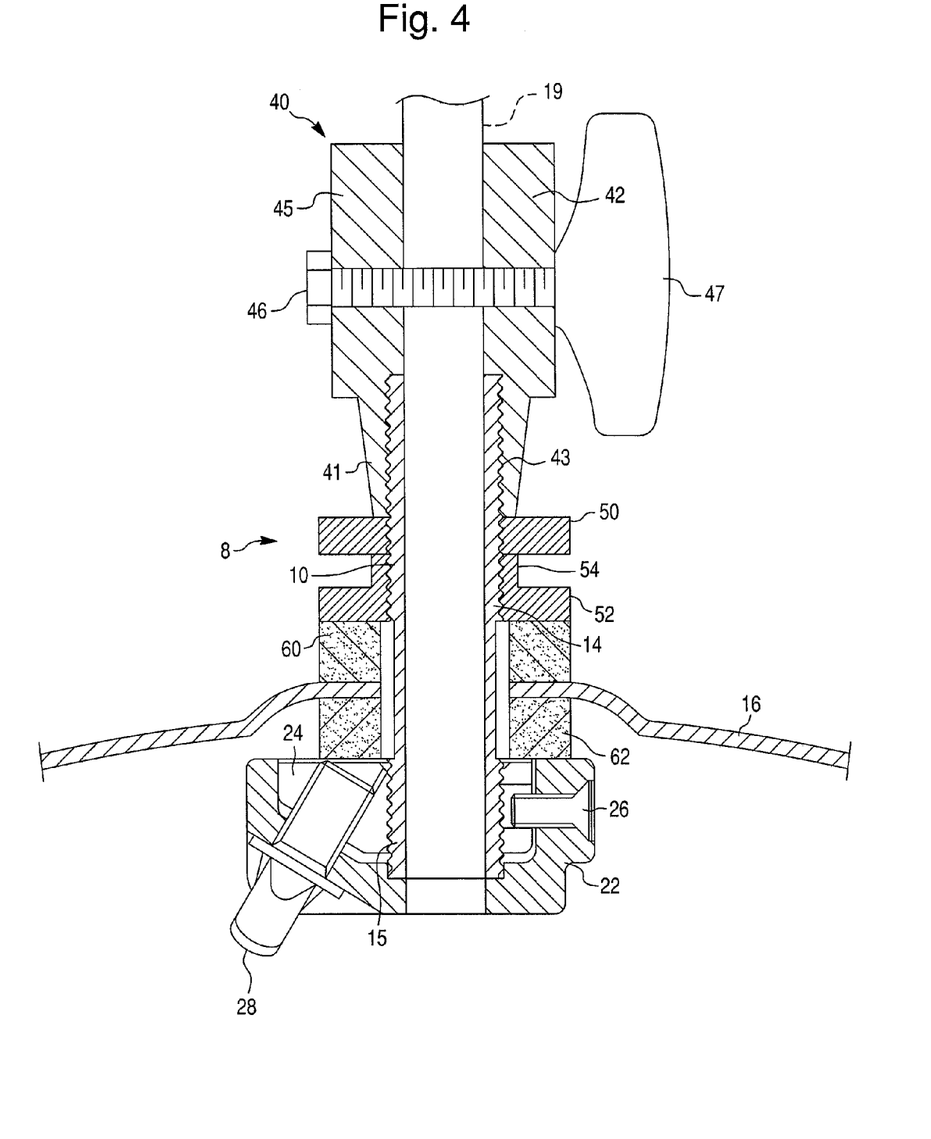
FIG. 4 is a sectional view of the hi-hat clutch for mounting the top cymbal according to the preferred embodiment of the present invention.
Figure 5:
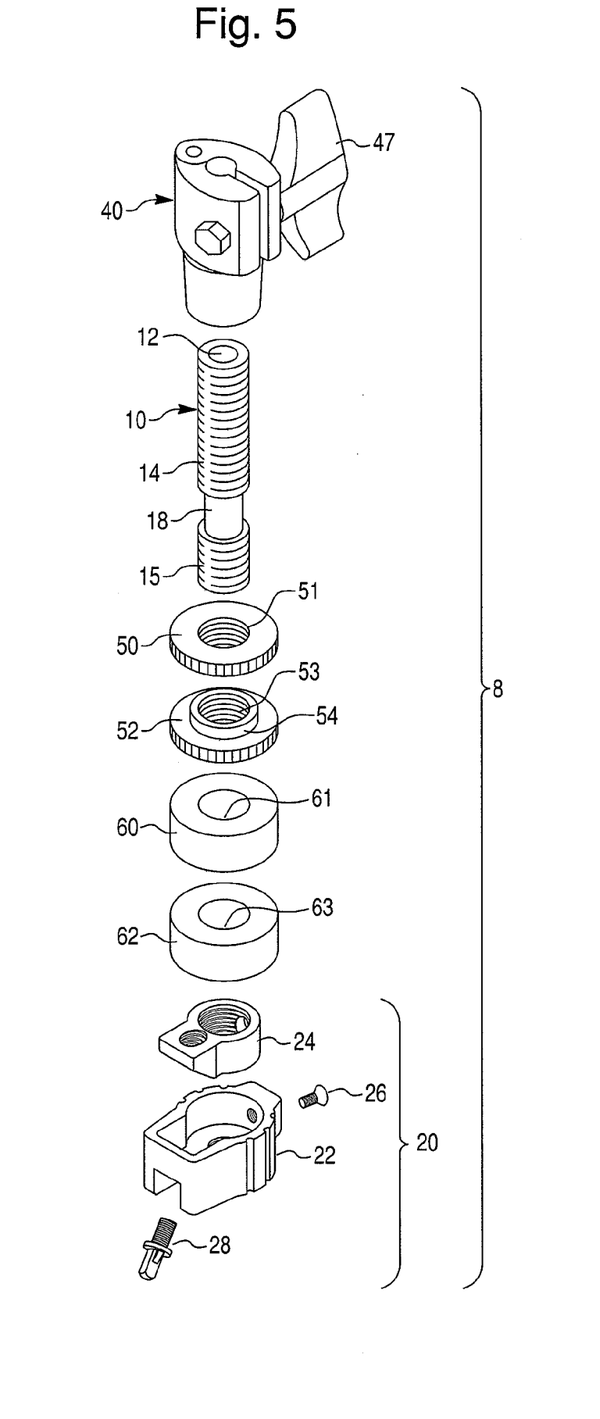
FIG. 5 is an exploded perspective view of the hi-hat clutch for mounting the top cymbal according to the preferred embodiment of the present invention.
Figure 6:
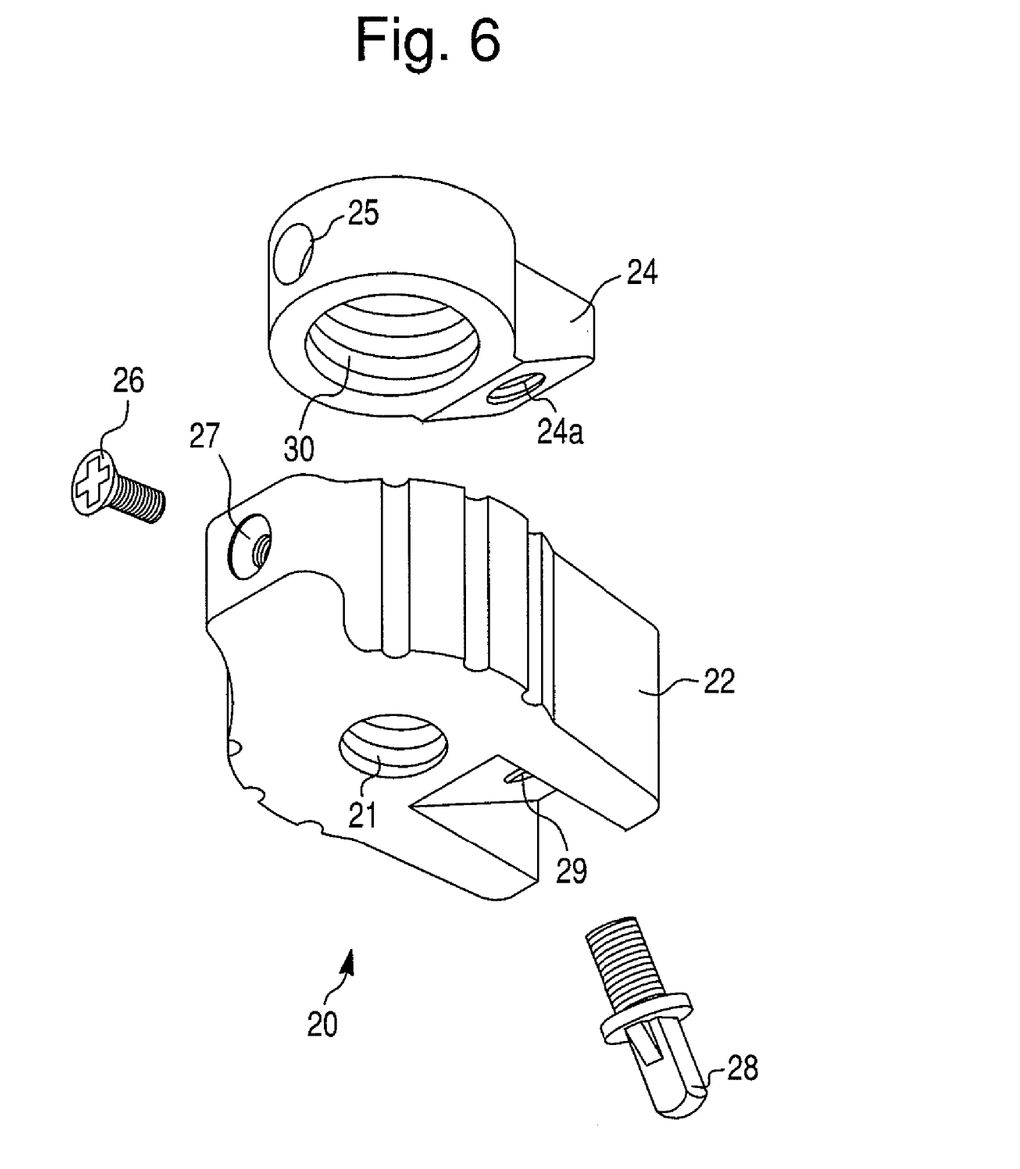
FIG. 6 is an exploded perspective view of a locking nut assembly according to the preferred embodiment of the present invention.
Figure 7:
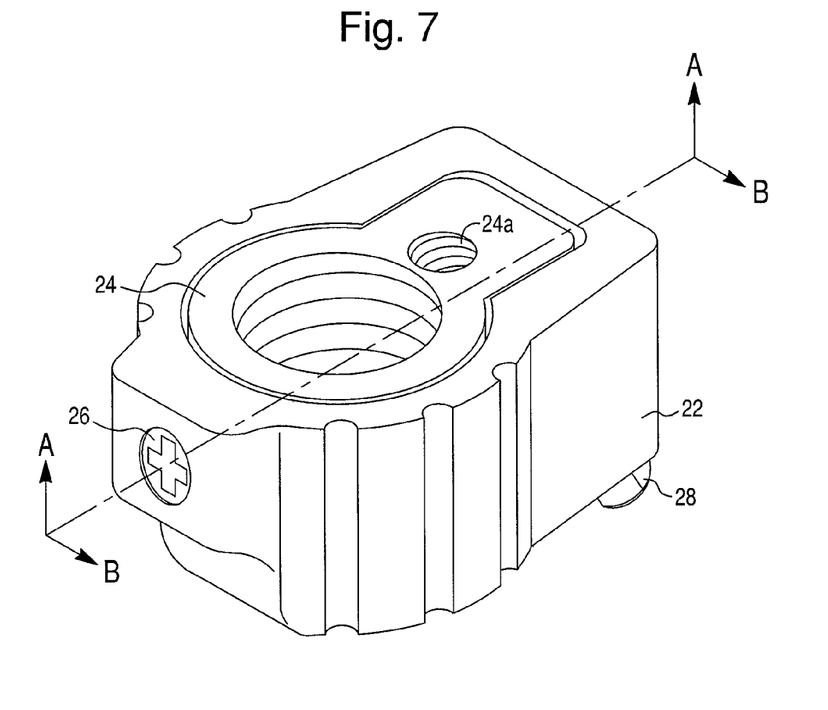
FIG. 7 is a perspective view of the locking nut assembly according to the preferred embodiment of the present invention.

Referring to FIGS. 3, 4, and 5, a preferred embodiment of an improved hi-hat clutch 8 for holding a top cymbal 16 of a pair of cymbals on a hi-hat stand 2 of this invention is depicted. The hi-hat clutch 8 comprises an externally threaded tubular stem 10, locking nut assembly 20, a clamp 40, an upper isolating piece 50, a lower isolating piece 52, an upper packing ring 60, and a lower packing ring 62.

The threaded tubular stem 10 having a penetrated pivot hole 12 in center and threads on external face is divided into three segments an upper thread segment 14, a lower thread segment 15, and a smooth segment 18 with a relatively shorter diameter located between the thread segments 14 and 15.

The clamp 40 includes a base block 41 at bottom end, a fixed wing block 42 in semi-arc is placed on top of the base block 41, and a movable wing block 44 pivotally secured to the fixed wing block 42 through a pin 45 to enable the movable wing block 44 to open or close. A through hole 43 in diameter corresponding with the threaded stem 10 is formed in center of the base block 41 for accommodating and locking the upper end of the thread stem 10. The clamp 40 is further provided with a bolt 46 and a wing nut 47.

A conventional hi-hat pull rod 19 can be inserted in the clamp 40 by opening the movable wing block 44, inserting the pull rod 19 between the fixed wing block 42 and the movable wing block 44 and deep into the pivot hole 12 in the threaded stem 10 via the through hole 43 of the base block 41, then, closing the movable wing block 44 and locking the wing nut 47 to fix the pull rod 19 in the clamp 40.

The upper isolating piece 50 having a tapped hole 51 in center position is to be screw-jointed to the threaded stem 10 under the base block 41. The lower isolating piece 52 having a tapped hole 53 in center position is to be screw-jointed to the threaded stem 10 under the upper isolating piece 50, wherein a protruding ferrule 54 is disposed on top of the lower isolating piece 52 to press against bottom of the upper isolating piece 50.

The upper packing ring 60 having a through hole 61 is used to straddle the tubular stem 10 under the lower isolating piece 52. Similarly, the lower packing ring 62 having a through hole 63 is used to straddle the tubular stem 10. An upper cymbal 16 of the hi-hat stand 2 will be pinched between the upper and lower packing rings 60, 62. In regard to the upper and lower isolating pieces 50, 52 and the upper and lower packing rings 60, 62, which are known in the art, shall not be reiterated here. Conventionally, the upper and lower packing rings 60 and 62 are made of felt or rubber.

A locking nut assembly 20 of the hi-hat clutch in accordance with the present invention is illustrated in detail in FIGS. 6-10. The locking nut assembly 20 comprises a main body 22, a locking nut 24, a set screw 26, and a key bolt 28. The main body 22 of the locking nut assembly 20 comprises an axial center hole 21, a projection portion projecting from one side of the main body 22, and a locking nut chamber 23 formed in the main body 22 for receiving the locking nut 24, as illustrated in detail in FIG. 10. An oblique bolt hole 29 extends obliquely downwardly through the main body 22 into the locking nut chamber. A transverse set screw opening 27 extends through the main body 22 perpendicularly to the center axis of the center hole 21 and into locking nut chamber 23 opposite the oblique bolt hole 29.

The locking nut 24 slidably fits into the locking nut chamber 23 formed in the main body 22 and has a transverse set screw hole 25 corresponding to and aligned with the transverse set screw opening 27 on the main body 22. The set screw 26 is inserted into the set screw opening 27 on the main body 22 and the set screw hole 25 on the locking nut 24 to secure the locking nut 24 in the locking nut chamber. The locking nut 24 is provided with a threaded portion defined by a central threaded opening 30 that is slightly larger in diameter than the lower thread segment 15 of the stem 10 to which the main body 22 is threaded. The locking nut 24 is further provided with a threaded oblique aperture 24a that is aligned with the oblique bolt hole 29 of the main body 22.

Figure 8:
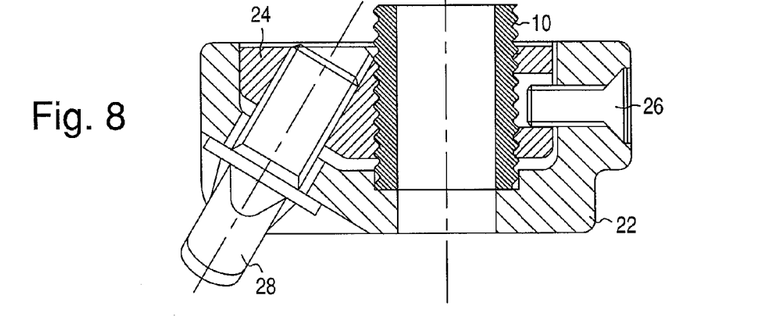
FIG. 8 is a cross-sectional view of the locking nut assembly according to the preferred embodiment of the present invention taken along line A-A in FIG. 7.
Figure 9:
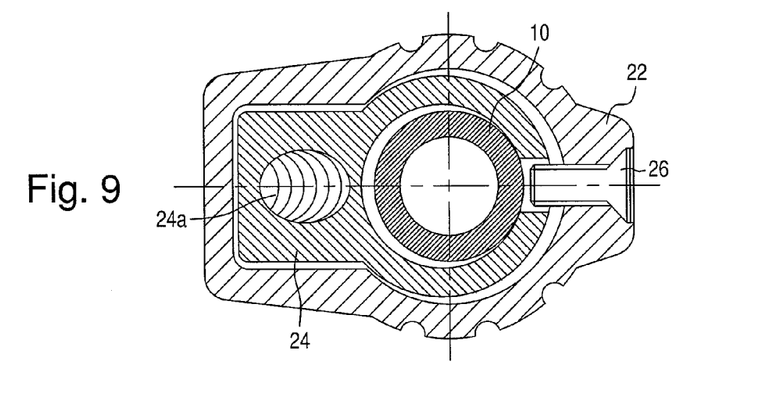
FIG. 9 is a cross-sectional view of the locking nut assembly according to the preferred embodiment of the present invention taken along line B-B in FIG. 7.
Figure 10:
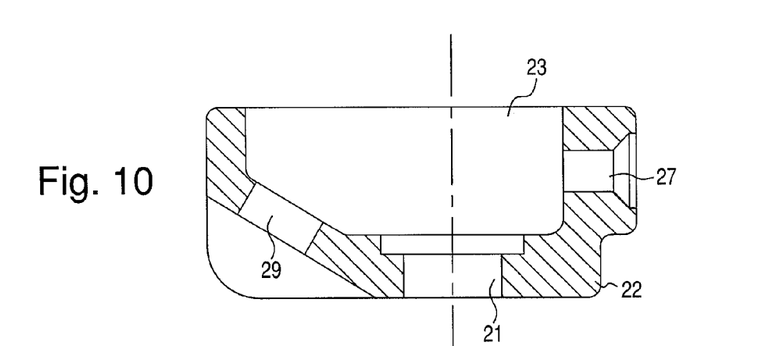
FIG. 10 is a cross-sectional view of a main body of the locking nut assembly according to the preferred embodiment of the present invention.

The key bolt 28 freely passes through the oblique bolt hole 29 and is threaded into the oblique aperture 24a of the locking nut 24, as illustrated in FIG. 8. The key bolt 28 is selectively threaded to tighten up the locking nut 24, which causes the locking nut 24 to radially slide relative to the main body 22 that, in turn, causes the threads of the threaded opening 30 on the locking nut 24 to be forced into engagement with the lower thread segment 15 of the stem 10. as illustrated in FIGS. 11a-12b. When fastened securely, the locking nut assembly 20 cannot be disconnected from the stem 10 without loosening the key bolt 28.

Figures 11A, 11B, 12A, 12B:
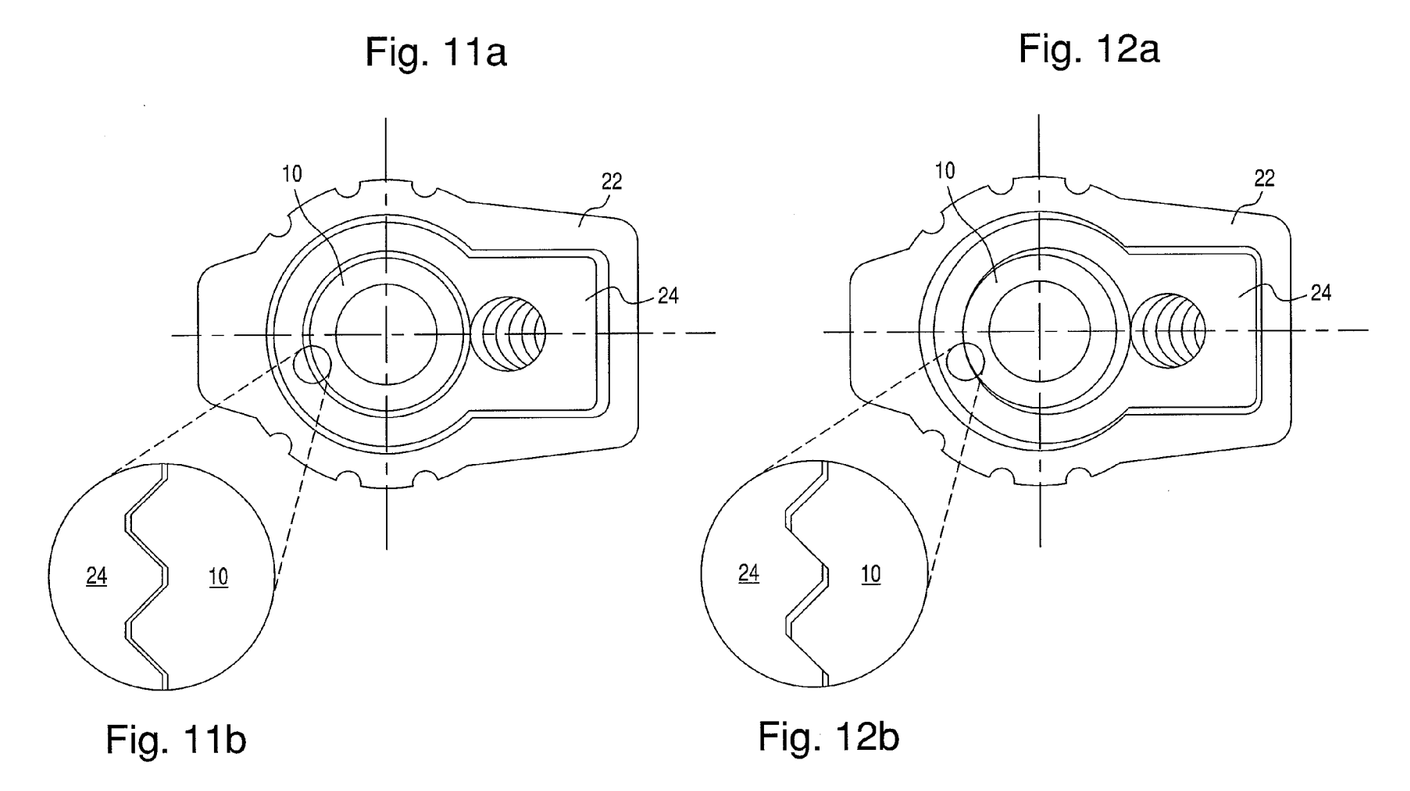
FIG. 11a illustrates the top view of the locking nut assembly of FIG. 7 in the unlocked position.
FIG. 11b is an enlarged view of the threads of a locking nut and a threaded stem of the locking nut assembly of FIG. 7 in the unlocked position.
FIG. 12a illustrates the top view of the locking nut assembly of FIG. 7 in the locked position.
FIG. 12b is an enlarged view of the threads of the locking nut and the threaded stem of the locking nut assembly of FIG. 7 in the locked position.

Referring to FIGS. 11a, 11b, 12a, 12b, the locking function of the locking nut assembly 20 is shown in FIGS. 11b and 12b which provide an enlarged partial view of the threads of the threaded opening 30 of the locking nut 24 and the lower thread segment 15 of the tubular stem 10. In FIG. 11b, the locking nut assembly 20 is illustrated in the unlocked or freely adjustable state so that the locking nut assembly 20 may be selectively adjusted on the tubular stem 10. In FIG. 12b, the locking nut assembly 20 is illustrated in the locked state whereby the locking nut assembly 20 is locked with respect to the threaded stem 10.

Although the present invention has been described in connection with a preferred embodiment thereof, many other variations and modifications will now become apparent to those skilled in the art. It is preferred, therefore, that the present invention be limited not by the specific disclosure herein, but only by the appended claims. For example, the shape of the main body 22 and the locking nut 24 may take many forms; likewise, the set screw 26 and the key bolt 28 may be relocated to a variety of positions, which is only limited by the function of retaining the locking nut within the main body and forcing the locking nut into engagement with the threaded stem. Moreover, while the key bolt 28 is shown with a specific head shaped to receive a drummer's key, the key bolt 28 may take a variety of forms. In the preferred embodiment, the clutch locking nut assembly is made by metal casting; however, the specific material for the components of the clutch locking nut assembly 20 may be formed from a cast, forged, injection molded, or other type of material known to those of skill in the art that meet the strength and durability requirements for hi hat cymbals and other percussion instruments.

The invention claimed is:

1. A cymbal fastening device comprising:

a main body having an axial threaded aperture for threading onto a threaded stem on a cymbal stand, said main body further having a bolt aperture;

a locking nut slidingly disposed adjacent said main body, said locking nut having a threaded portion facing said threaded stem, said locking nut further having a threaded aperture;

a threaded bolt passing through said bolt aperture of said main body, said threaded bolt being threaded into said threaded aperture of said locking nut;

wherein said threaded bolt is selectively tightened to cause said locking nut to radially slide relative to said main body so as to force said threaded portion of said locking nut into engagement with said threaded stem, and wherein said threaded portion of said locking nut circumscribes said threaded stem when disposed on said cymbal stand.

2. The cymbal fastening device of claim 1, further comprising a set screw passing through a second threaded aperture of said main body and into a recess in said locking nut.

3. The cymbal fastening device of claim 2, wherein said second threaded aperture is disposed opposite said threaded aperture with respect to an axis defined by said threaded stem.

4. The cymbal fastening device of claim 1, wherein said threaded portion of said locking nut has an inner diameter that is larger than an outer diameter of said threaded stem.

5. The cymbal fastening device of claim 1, wherein said bolt aperture of said main body is oblique with respect to an axis defined by said threaded stem.

6. The cymbal fastening device of claim 1, wherein said threaded aperture of said locking nut is oblique with respect to an axis defined by said threaded stem.

7. The cymbal fastening device of claim 1, wherein said main body and said locking nut are made of steel.

8. The cymbal fastening device of claim 1, wherein said locking nut is disposed within a chamber formed within said main body.

9. A cymbal fastening device for selectively adjusting an angle of oscillation for a cymbal, said cymbal fastening device comprising:
 a main body having an axial threaded aperture for threading onto a threaded stem on a cymbal stand, said main body further having a bolt aperture;
 a locking nut disposed within a chamber formed in said main body, said locking nut having an annular threaded portion circumscribing said threaded stem, said locking nut further having a threaded aperture;
 a threaded bolt freely passing through said bolt aperture of said main body, said threaded bolt being threaded into said threaded aperture of said locking nut;
 wherein said threaded bolt is selectively tightened to pull said threaded portion of said locking nut into engagement with said threaded stem.

10. The cymbal fastening device of claim 9, further comprising a set screw passing through a second threaded aperture of said main body and into a recess in said locking nut.

11. The cymbal fastening device of claim 10, wherein said second threaded aperture is disposed opposite said threaded aperture with respect to an axis defined by said threaded stem.

12. The cymbal fastening device of claim 9, wherein said threaded portion of said locking nut has an inner diameter that is larger than an outer diameter of said threaded stem.

13. A cymbal fastening device comprising:
 a main body having an axial threaded aperture for threading onto a threaded stem on a cymbal stand, said main body further having a bolt aperture;
 a locking nut disposed adjacent said main body, said locking nut having a threaded portion facing said threaded stem, said locking nut further having a threaded aperture;
 a threaded bolt passing through said bolt aperture of said main body, said threaded bolt being threaded into said threaded aperture of said locking nut;
 wherein said threaded bolt is selectively tightened to force said threaded portion of said locking nut into engagement with said threaded stem, and wherein said threaded portion of said locking nut circumscribes said threaded stem when disposed on said cymbal stand, and wherein said bolt aperture of said main body is oblique with respect to an axis defined by said threaded stem.

* * * * *